(12) United States Patent
Johnson, Jr.

(10) Patent No.: US 7,644,353 B2
(45) Date of Patent: Jan. 5, 2010

(54) SYSTEMS AND METHODS FOR STREAMLINED INTERACTIONS WITH DOCUMENT SERVICES FROM MOBILE COMPUTING APPLICATIONS

(75) Inventor: Swen R. Johnson, Jr., San Gabriel, CA (US)

(73) Assignee: Xerox Corporation, Norwalk, CT (US)

( * ) Notice: Subject to any disclaimer, the term of this patent is extended or adjusted under 35 U.S.C. 154(b) by 436 days.

(21) Appl. No.: 10/270,618

(22) Filed: Oct. 16, 2002

(65) Prior Publication Data

US 2004/0078752 A1 Apr. 22, 2004

(51) Int. Cl.
*G06N 3/00* (2006.01)
(52) U.S. Cl. ...................................... 715/234
(58) Field of Classification Search ................. 715/500, 715/513, 517, 523, 530, 234, 243, 254; 709/200
See application file for complete search history.

(56) References Cited

U.S. PATENT DOCUMENTS

| | | | | |
|---|---|---|---|---|
| 5,862,321 | A * | 1/1999 | Lamming et al. | 709/200 |
| 6,518,950 | B1 * | 2/2003 | Dougherty et al. | 345/156 |
| 6,658,456 | B1 * | 12/2003 | Shimoosawa | 709/206 |
| 6,857,102 | B1 * | 2/2005 | Bickmore et al. | 715/205 |
| 6,993,562 | B2 * | 1/2006 | Treptow et al. | 709/206 |
| 7,085,801 | B1 * | 8/2006 | Abdelhadi et al. | 709/201 |
| 2003/0074632 | A1 * | 4/2003 | Marks et al. | 715/500 |
| 2003/0093565 | A1 * | 5/2003 | Berger et al. | 709/246 |
| 2003/0095524 | A1 * | 5/2003 | Stephens et al. | 370/338 |

FOREIGN PATENT DOCUMENTS

| | | |
|---|---|---|
| EP | 0 893 759 A2 | 1/1999 |
| EP | 0 893 760 A2 | 1/1999 |
| GB | 2 342 195 A | 4/2000 |
| GB | 2 342 196 A | 4/2000 |
| GB | 2 342 197 A | 4/2000 |

* cited by examiner

*Primary Examiner*—Kyle R Stork
(74) *Attorney, Agent, or Firm*—Oliff & Berridge, PLC

(57) ABSTRACT

A document-services dialog window, accessible from all applications of a mobile computing device (MID), interacts with other applications on the MID, and with remote document services on a document access server. The applications on the MID are linked to the document access server and to the document references stored in a document reference repository on the MID. The document references can be beamed to another MID. The document services interface is invoked to access a desired document reference and enables a user of a MID to execute actions on a selected document via the selected document reference.

18 Claims, 16 Drawing Sheets

FAX COVERSHEET DETAILS

TO: JOHN DOE
COMPANY: XEROX MOBILE SOLUTIONS
FROM: SWEN JOHNSON
COVER MSG: THOUGHT YOU MIGHT LIKE TO SEE THIS.

--SWEN

[DONE] [CANCEL]

*FIG. 5*

SYSTEMS AND METHODS FOR STREAMLINED INTERACTIONS WITH DOCUMENT SERVICES FROM MOBILE COMPUTING APPLICATIONS

BACKGROUND OF THE INVENTION

1. Field of Invention

This invention generally relates to systems and methods for interacting with computer program applications.

2. Description of Related Art

Portable document solutions for Personal Digital Assistant-class (PDA-class) devices from competing vendors rely on remote servers to perform the services. A user interacts with the remote server through a general-purpose browser, which has fill-in fields, action buttons, and so forth. The document creator applications, e-mail software, communication software, and mobile information device-resident browsers installed on many PDA-class devices often come from various suppliers.

A mobile information device (MID) is a handheld device that combines computer applications, telephony and/or remote networking features. A typical mobile information device can function as a cellular phone and/or a personal organizer. A mobile information device may be equipped with a hypertext-markup-language (HTML) or wireless access protocol (WAP) browser and/or e-mail reader.

High value information is frequently inaccessible to users of mobile information devices (MID) because this information is often in a file having a file format that is inaccessible to software installed on the mobile information device or because it is otherwise inaccessible for some other reason. Such files may be in any number of file formats, for example, spreadsheet, word processing, or high-resolution graphical file formats. Software applications, which can interact with the data format of the files to be accessed, are not typically installed on the mobile information device. Therefore, the user of the mobile information device cannot access the information embedded in such files. Instead, these applications may be installed at a remotely-located document access server. A document access server allows a remote user to fax, print, and/or view information stored on, or otherwise accessible to the document access server. In response to a command issued at the mobile information device, the document access server prepares the attachment for viewing, printing and/or faxing, and dispatches the prepared document to a target fax machine, printer, or other appropriate device.

SUMMARY OF THE INVENTION

This invention provides systems and methods that permit streamlined interactions with document services by linking diverse applications on a mobile computing device, such as a contact list, e-mail applications, and so forth, to a document access server.

This invention separately provides systems and methods that provide a document reference repository.

This invention further provides systems and methods that provide the document reference repository on the mobile information device.

This invention separately provides systems and methods that allow diverse applications on a mobile information device to be linked to a document reference repository.

This invention separately provides systems and methods that provide for sharing document references with other mobile information devices.

This invention separately provides systems and methods that allow diverse applications on a mobile information device to be linked to an application or the like that implements sharing of document references with other mobile information devices.

In various exemplary embodiments of the systems and methods according to this invention, a small pop-up document-services dialog window is accessible from all applications of a mobile computing device by way of a globally-available menu item. The document-services dialog window and zero, one or more auxiliary dialog windows interact with other applications on the mobile information device, and with remote document services.

In various exemplary embodiments of the systems and methods according to this invention, a document services interface is invoked to access a desired document service. The document services interface enables a user of a mobile information device to execute actions on a selected document through, or by using, a document access server. In various exemplary embodiments, the interface is invoked by selecting an icon in a browser window whose contents are generated by a document access server. In various other exemplary embodiments, the interface is invoked by selecting a globally accessible menu item after first selecting a unique identifier within a text display area that is supplied by some other application's interface. In various other exemplary embodiments, the interface can be invoked either by selecting an icon in a browser window whose contents are generated by a document access server and/or by selecting a globally accessible menu item after first selecting a unique identifier within a text display area that is supplied by some other application's interface.

In various exemplary embodiments, an action to be executed on the document is determined. In various exemplary embodiments, a database of available actions is stored on the mobile information device. In various other exemplary embodiments, available actions are hard-coded into the interface. An action identifier is determined for a selected action. In various exemplary embodiments, the action identifier is a textual identifier similar to the menu selection corresponding to the action. In various other exemplary embodiments, the action identifier is a numeric identifier.

In various exemplary embodiments, one or more optional action options are determined. An action option modifies a selected action. In various exemplary embodiments, the document identifier, action identifier, and one or more optional action option identifiers are transmitted back to the document access server. In response, the document access server performs the selected action on the document identified by the document identifier. Accordingly, it is not necessary for the software required to open or access that document to be installed on the mobile information device. Nor is it necessary, to perform the selected action on the selected document, to download that document from the document access server to the mobile information device, or to re-upload that document back to the document access server from the mobile information device.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the following figures, wherein:

FIG. 5 illustrates one exemplary embodiment of a facsimile cover sheet interface screen according to this invention;

DETAILED DESCRIPTION OF EXEMPLARY EMBODIMENTS

Figure 1:
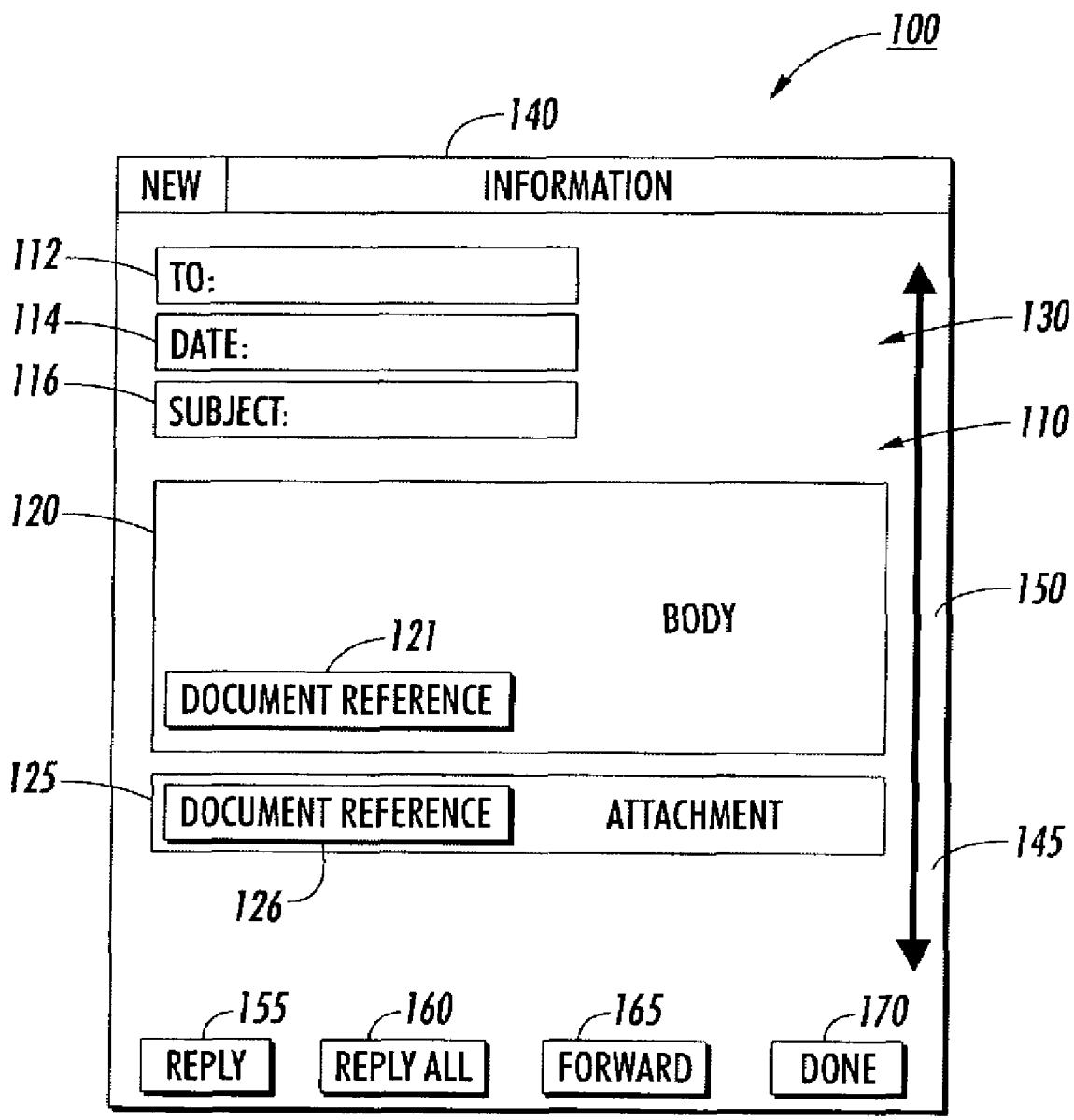
FIG. 1 illustrates one exemplary embodiment of an e-mail file that contains a document reference according to this invention.

In various exemplary embodiments according to this invention, unique document references or document identifiers are icons appearing in a browser display or window. The browser display or window may present content from the Internet, an intranet, an extranet, or any other known or later-developed distributed network that is accessible from the document access server. In various exemplary embodiments, the unique document references or document identifiers are derived from Internet or intranet uniform resource locators (URLs). The mobile information device typically communicates with the document access server through some wireless or wired networking technology, often over the Internet. The document access server uses similar technology to access documents, associated with a document reference, that may be located elsewhere on the Internet, or on an intranet, an extranet, a local area network, a wide area network, a storage area network, and/or any other known or later-developed distributed network.

In various exemplary embodiments, the unique document references or document identifiers are displayed in the browser window as selectable text within an application running on the mobile information device, such as, but not limited to, e-mail applications, calendar applications, note-taking applications or any other appropriate known or later-developed application. As discussed below in greater detail, the unique document references or document identifiers can also be stored into a document reference repository and/or shared between different mobile information devices by various communication means, including, but not limited to, infrared or radio-frequency "beaming".

The following detailed discussion is directed to one specific type of application, an e-mail application, with which the browser window and document references or document identifiers are usable. However, it should be appreciated that this is for ease of understanding and familiarity only, and should not be interpreted as limiting the types of applications with which the systems and methods according to this invention are usable.

It should also be appreciated that using the document references or the document access server according to this invention does not require the mobile information device to be continuously connected to a document access server. That is, it is possible to do useful things with a document reference, such as, for example, sharing the document reference with other mobile information devices, or creating a new document reference, without having to be connected to a remotely-located document access server. This is advantageous because a wireless mobile information device may not always be within range of a broadcast tower; because use of the wireless service is often charged per-minute; and because certain actions can be accomplished more quickly when the mobile information device does not have to engage in two-way communication with a document access server.

For example, e-mail readers typically allow a user to download e-mail messages addressed to that user from the remotely-located document access server. The user can then disconnect from the e-mail server and read the downloaded e-mail messages at the user's leisure. In various exemplary embodiments according to this invention, the user can open the downloaded e-mail messages, and save any document references that may appear in the downloaded e-mail messages into the document reference repository. The user can then operate on the saved document references, such as by faxing, printing, beaming and/or any other desired action, when it is convenient to wirelessly re-connect to the remotely-located document access server, and do all of the desired operations on the saved document references in a single batch.

FIG. 1 illustrates one exemplary embodiment of a graphical user interface or browser display or window 100 that is usable to display the contents of an e-mail document that includes a document reference or document identifier according to this invention. As shown in FIG. 1, the e-mail document 110 is displayed within the graphical user interface or browser display or window 100. The e-mail document 110 contains one or more of a recipient field 112, a date field 114, a subject field 116, and/or a body field 120. In various exemplary embodiments, the body field 120 contains one or more lines of user-readable text. In various exemplary embodiments, the e-mail document 110 contains one or more unique document references 121 in the body field 120 that each uniquely identifies and/or refers to one of a number of electronic documents that are the subject of, or other wise accessible through the e-mail document 110.

In various exemplary embodiments, each of the one or more referenced electronic documents is identified by a unique document identifier or document reference 121. It should be appreciated that these terms are generally interchangeable. In various exemplary embodiments, each document reference or document identifier 121 may be one or more of a user-friendly text string, a uniform resource locator (URL), and/or an iconic representation of the referenced electronic document. In fact, each document identifier may be displayed in any manner by which a user of a mobile information device, on which the graphical user interface or browser display or window 100 and the e-mail document 110 are displayed, may receive visual information.

It should be appreciated that, in various exemplary embodiments, the graphical user interface or browser display or window 100 may also include an attachment field 125. In various exemplary embodiments, the attachment field 125 contains one or more document references or document identifiers 126 that identify corresponding documents that were included as attachments to the e-mail document 110. In general, such an attachment field will be implemented in a way specific to the particular e-mail application. However, it should be appreciated that any known or later-developed method for implementing the attachment field 125 can be used.

In various exemplary embodiments, the graphical user interface or browser display or window 100 displays the e-mail document 110 inside a window or application area 130. An informational area 140 of the window or application area 130 may display informational items relating to the e-mail document 110. Thus, application or document information 140 may be displayed along, for example, the top border of the window or application area 130. A scroll bar 145 may be displayed in the graphical user interface or browser display or window 100. The scroll bar 145 enables a user of the graphical user interface or browser display or window 100 to intuitively determine the position of a displayed portion within, and the extent of, the e-mail document 110 being displayed. In various exemplary embodiments, the scroll bar 145 may include a portion 150 displaying this information.

In various exemplary embodiments, the graphical user interface or browser display or window 100 also may present the user with various options for processing the displayed document, such as the e-mail document 110, such as a "reply" function accessed via a Reply button 155, a "reply all" function accessed via a Reply All button 160, a "forward message" function accessed via a Forward button 165 and a "close message" function accessed via a Done button 170. In various exemplary embodiments, clicking the Reply button 155 invokes the reply function, which enables a user of the graphical user interface or browser display or window 100 to send a reply message back to the sender of the e-mail document 110.

In various exemplary embodiments, clicking the Reply All button 160 invokes the reply all function, which enables a user of the graphical user interface or browser display or window 100 to direct a reply message back to the sender of the e-mail document 110 and all other addressees of the e-mail document 110. In various exemplary embodiments, clicking the Forward button 165 invokes the forward message function, which enables a user of the graphical user interface or browser display or window 100 to forward the e-mail document 110 to another recipient. Finally, in various exemplary embodiments, clicking the Done button 170 invokes the close message function, which enables a user of the graphical user interface or browser display or window 100 to close the e-mail document 110, and optionally perform any selected actions on the e-mail document 110. The Done button may also close the graphical user interface or browser display or window 100.

As indicated above, documents associated with the e-mail document 110, which are accessible through the graphical user interface or browser display or window 100, are represented by unique document references or document identifiers 121. In particular, these document references or document identifiers 121 can be understood, parsed or interpreted by the document access server. That is, in various exemplary embodiments of the systems and methods according to this invention, a repository is provided on the mobile information device in which unique identifiers can be stored and/or managed for later use with the document access server and/or for sharing with other mobile information devices. Additionally, in various exemplary embodiments of the systems and methods according to this invention, a user is able to directly enter a unique document reference or document identifier 121 for a document that may not yet exist using any data entry mode that is supported by the mobile information device being used. This allows all unique identifiers accessible to the mobile information devices to be shared with other mobile information devices by various techniques, including, but not limited to, infrared or radio-frequency "beaming", as will be discussed below in greater detail.

In various exemplary embodiments, clicking or selecting one of the one or more document references 121 (or the document references 126 if the attachment field 125 is implemented) invokes a document services interface. In various exemplary embodiments, the document services interface may also be invoked by selecting a globally accessible menu item. For example, in various exemplary embodiments, the document services interface may also be invoked by first selecting a document identifier presented in any other application, in addition to or instead of the e-mail application discussed above, that is capable of storing and/or presenting document identifiers, followed by invocation of a globally accessible menu item.

Figure 2:
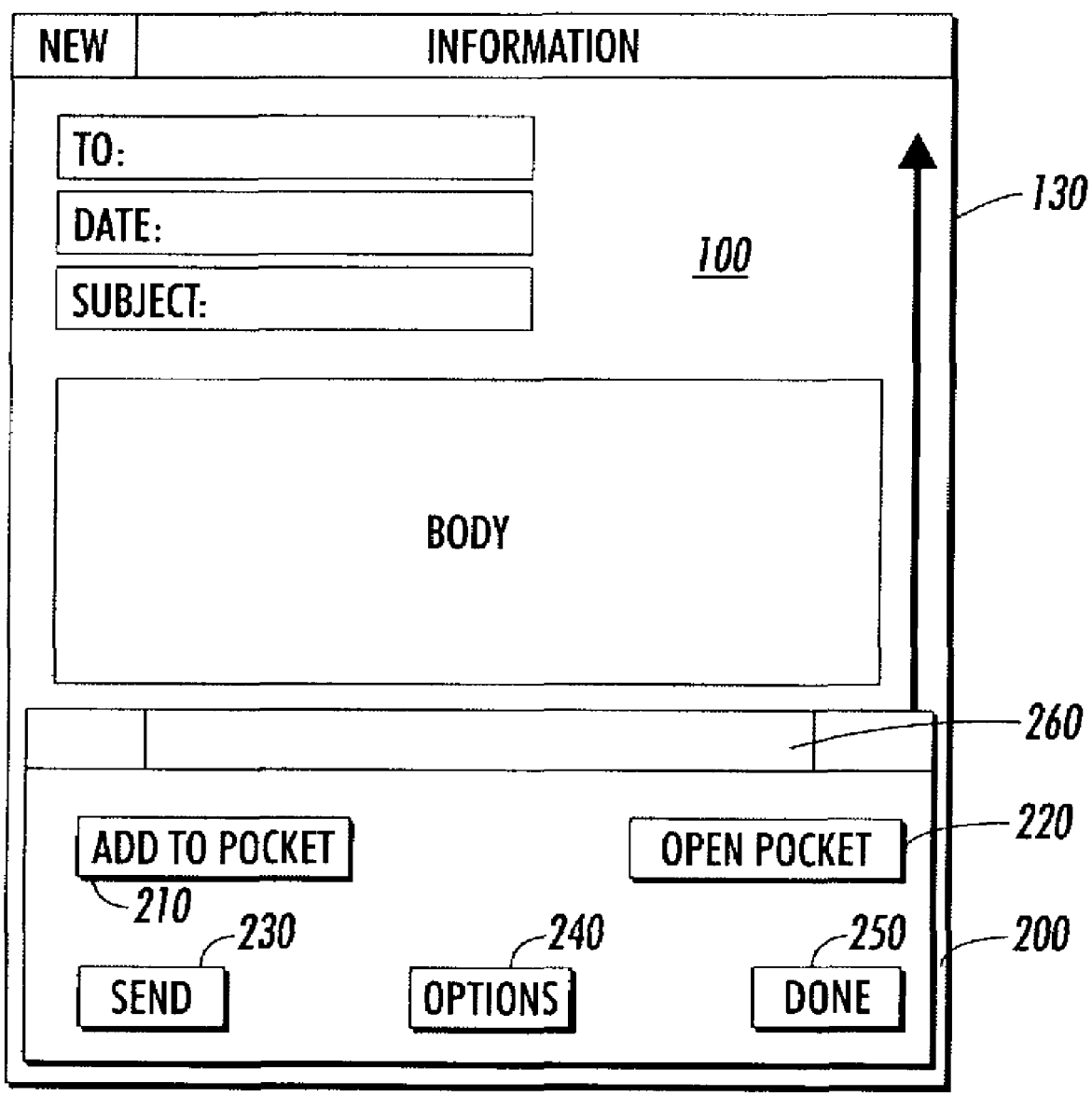
FIG. 2 illustrates one exemplary embodiment of a document services interface in accordance with this invention.

FIG. 2 illustrates one exemplary embodiment of a document services interface in accordance with this invention. As shown in FIG. 2, in various exemplary embodiments, the document services interface 200 may be activated from the graphical user interface or browser display or window 100. In this case, the document services interface 200 may graphically overlay the e-mail document 110 displayed in the graphical user interface or browser display or window 100. In various exemplary embodiments, the document services interface 200 contains an informational field 260. The informational field 260 displays information relating to the document reference 121 being processed. In various exemplary embodiments, the informational field 260 displays information relating to the document services interface 200 itself.

In various exemplary embodiments, the document services interface 200 enables a user to access a document identifier database, or access a document identifier repository, that is resident on the mobile information device. Thus, clicking the Add To Pocket button 210 accesses a save function that enables a user to save the currently selected document identifier 121 to the document identifier database or repository. Moreover, clicking the Open Pocket button 220 invokes the document identifier database or repository, enabling a user to select a previously-saved document identifier 121 stored in the document identifier database or repository for further processing.

In various exemplary embodiments, the document services interface 200 enables the user to select an action to be performed on the document corresponding to the selected document identifier 121. In various exemplary embodiments, an action may be selected by selecting the Options widget 240. In various exemplary embodiments, the Options widget 240 accesses or invokes an options entry interface. The options entry interface presents action selections, for example, via a drop-down list. In various exemplary embodiments, these actions can include faxing, printing and/or beaming the identified document, as well as any other appropriate known or later-developed action that can be performed against a document identified by a selected document identifier 121. In various exemplary embodiments, the selected action may be executed by activating the Send button 230. The send button 230 invokes a "perform action" function that performs the selected action on the document identified by the selected document identifier 121. Alternatively, a user may quit the document services interface 200 without executing the selected actions on that document by clicking the Done button 250 to close the document services interface 200.

Figure 3:
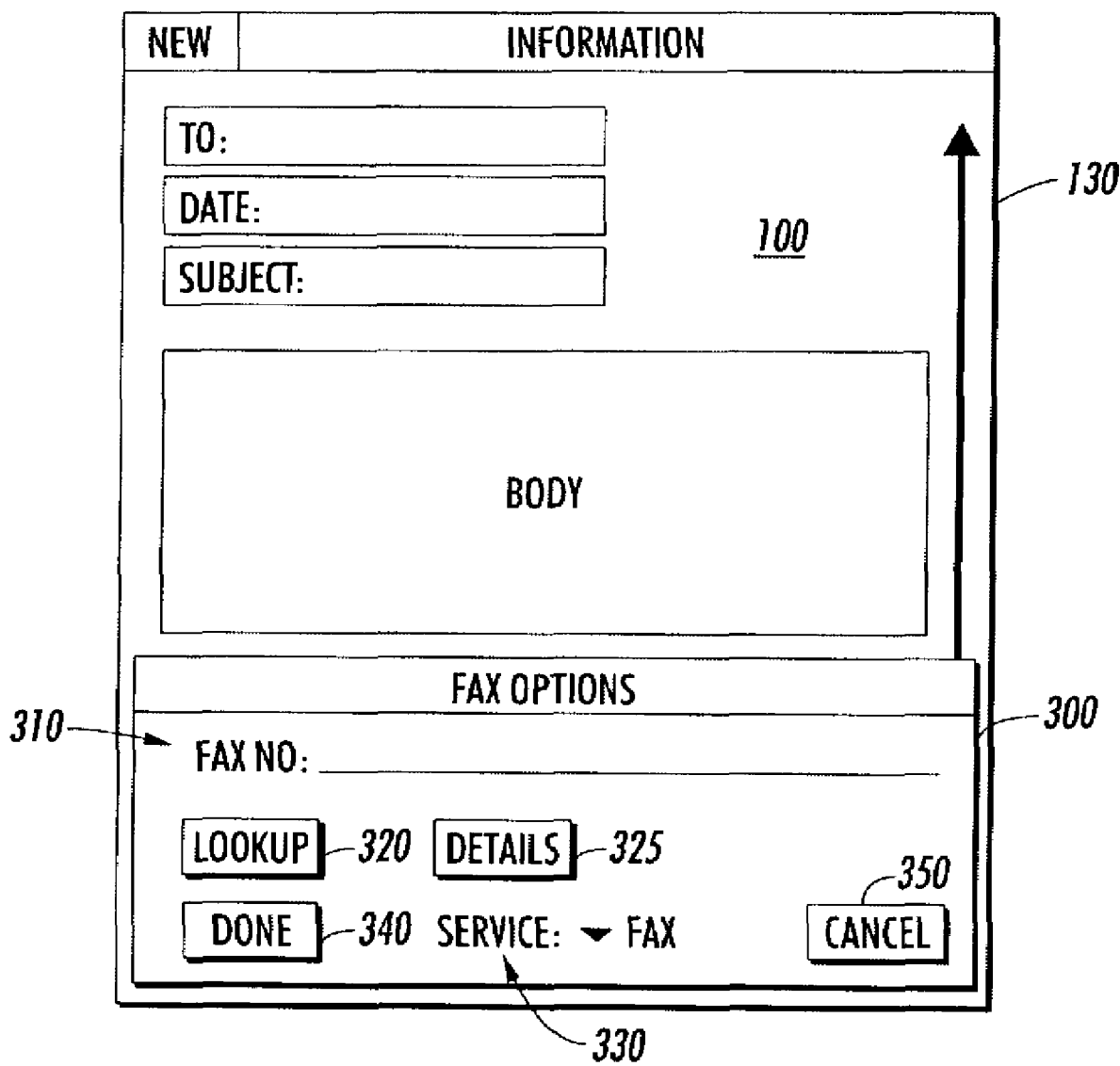
FIG. 3 illustrates one exemplary embodiment of a facsimile options interface according to this invention.

FIG. 3 illustrates one exemplary embodiment of a facsimile options interface 300 according to this invention. As shown in FIG. 3, the facsimile options interface 300 includes a fax number entry field 310. In various exemplary embodiments, the fax number of an intended recipient may be entered into the facsimile options interface 300 by manually entering the digits of that fax number into the fax number entry field 310. In various other exemplary embodiments, the facsimile options interface 300 also contains a Lookup button 320 and/or a Details button 325. Activating the Lookup button 320 allows the user to access a contact list or the like. For example, many mobile information devices maintain a contact list database that is accessible by any application that is executing on that mobile information device. In various exemplary embodiments, activating the Lookup button 320 accesses this contact list.

Figure 4:
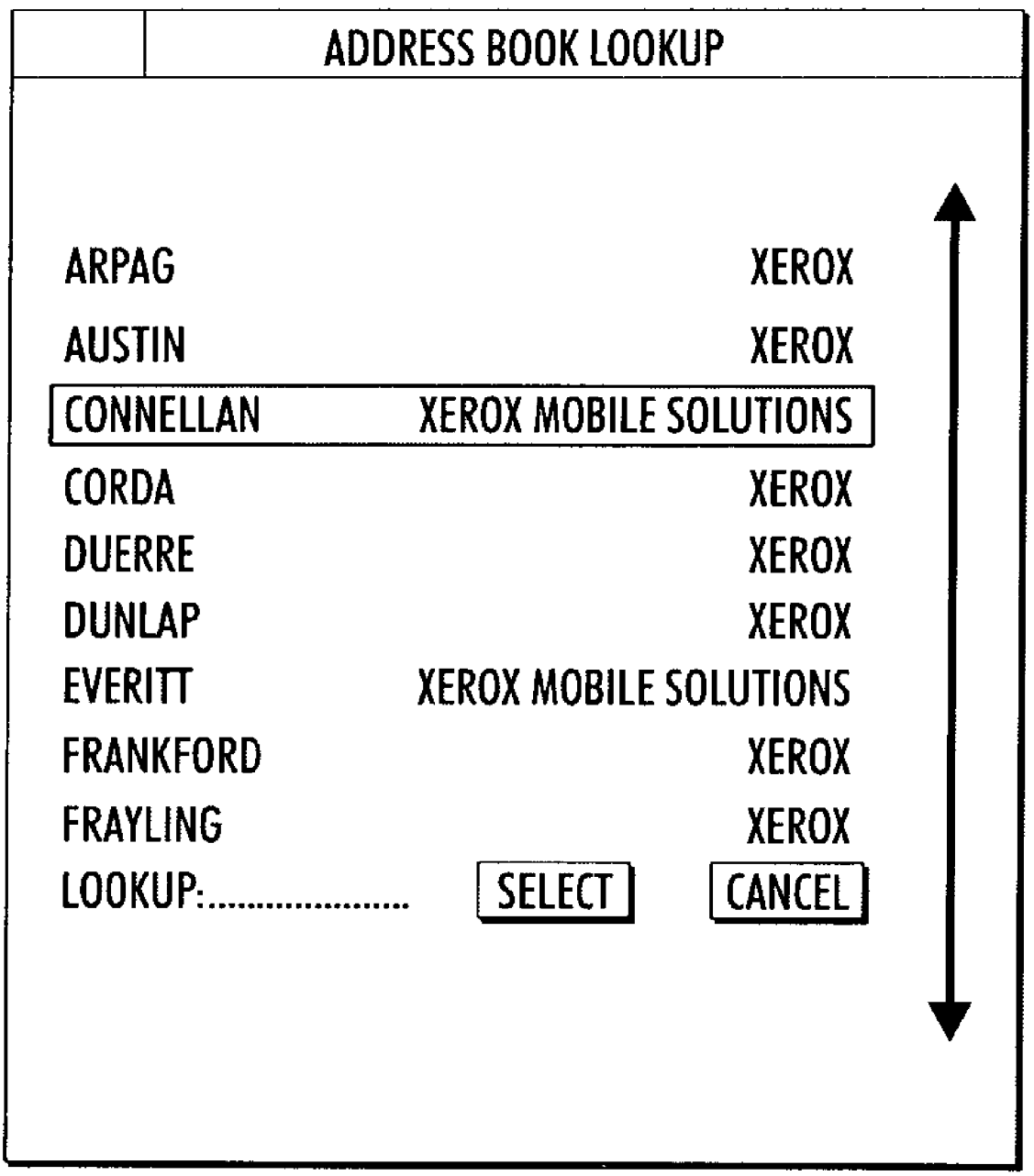
FIG. 4 illustrates one exemplary embodiment of an address book lookup interface screen according to this invention.

FIG. 4 shows one exemplary embodiment of a contacts list or address book lookup interface screen that can be accessed using the lookup button 320. In various exemplary embodiments, the entries in the contact list or address book accessed using the contacts list or address book lookup interface contain fax number information for one or more contact records. In various exemplary embodiments, selecting a contact record displayed in the contacts list or address book lookup interface automatically enters fax number information into the fax number entry field 310 from that contact record. In various exemplary embodiments, other relevant information, such as a recipient's name, address, and other identifying information, may be transferred from the contact list application, as well, upon selecting a particular contact record.

For example, as shown in FIG. 5, in various exemplary embodiments, upon selecting a particular contact record, the other relevant information, such as a recipient's name, address, and other identifying information, is transferred from the contact list or address book into a facsimile cover sheet. That is, FIG. 5 shows one exemplary embodiment of a cover sheet interface screen that displays a facsimile cover sheet that has been automatically populated with information from the selected contact record selected using the contacts list or address book lookup interface. Selecting the Details button 325 accesses a details interface (not shown) that allows the user to specify whether the facsimile cover sheet is to be automatically prepared or not from the information contained in the selected contact record. Additionally, in various exemplary embodiments, when the facsimile cover sheet is selected, the details interface allows the user to easily access the facsimile cover sheet to add a message to the facsimile cover sheet or to alter any of the information that was automatically entered into the facsimile cover sheet.

In various exemplary embodiments, the facsimile options interface 300 contains an action selection widget 330. In various exemplary embodiments, the available actions are presented in a drop-down list that is accessed by selecting the action selection widget. In various exemplary embodiments, selecting an action via the action selection widget 330 invokes an action dialog widget for the selected action. The actions include, but are not limited to, one or more of faxing, beaming or printing.

In various exemplary embodiments, the facsimile options interface 300 contains a Done button 340. Activating the Done button 340 closes the facsimile options interface 300 and prepares the information contained in the facsimile options interface 300 for communication to the document access server. In various exemplary embodiments, the information includes the selected or supplied fax number, as well as any facsimile cover sheet that may have been selected and/or prepared, as outlined above.

It should also be appreciated that, in various exemplary embodiments, the choice of a particular action and any related options is "sticky". That is, once an action, and optionally, any options for that action, has been selected, for example, by activating the Done button 340, that action and the related options, if any, are automatically used on the next invocation of the Send button 230. For example, if a fax action is executed for one particular document, and the user subsequently chooses another document reference, followed by invoking the Send button, the fax action will again be executed with the same options as the previous execution, against the document associated with the new document reference. Of course, if a different action is selected before invoking Send button 230 the subsequent time, the new action will be invoked instead of the old one, and it will have different options. In this case, in various exemplary embodiments, the selected options of the previous action are not used. In contrast, in various other exemplary embodiments, any overlapping options between the two actions will use the data entered for those options for the previous action.

In various exemplary embodiments, the facsimile options interface 300 includes a Cancel button 350. Activating the Cancel button 350 cancels any selected facsimile options, optionally clears any selected and/or suggested information, and returns control back to the document services interface 200.

Figure 6:
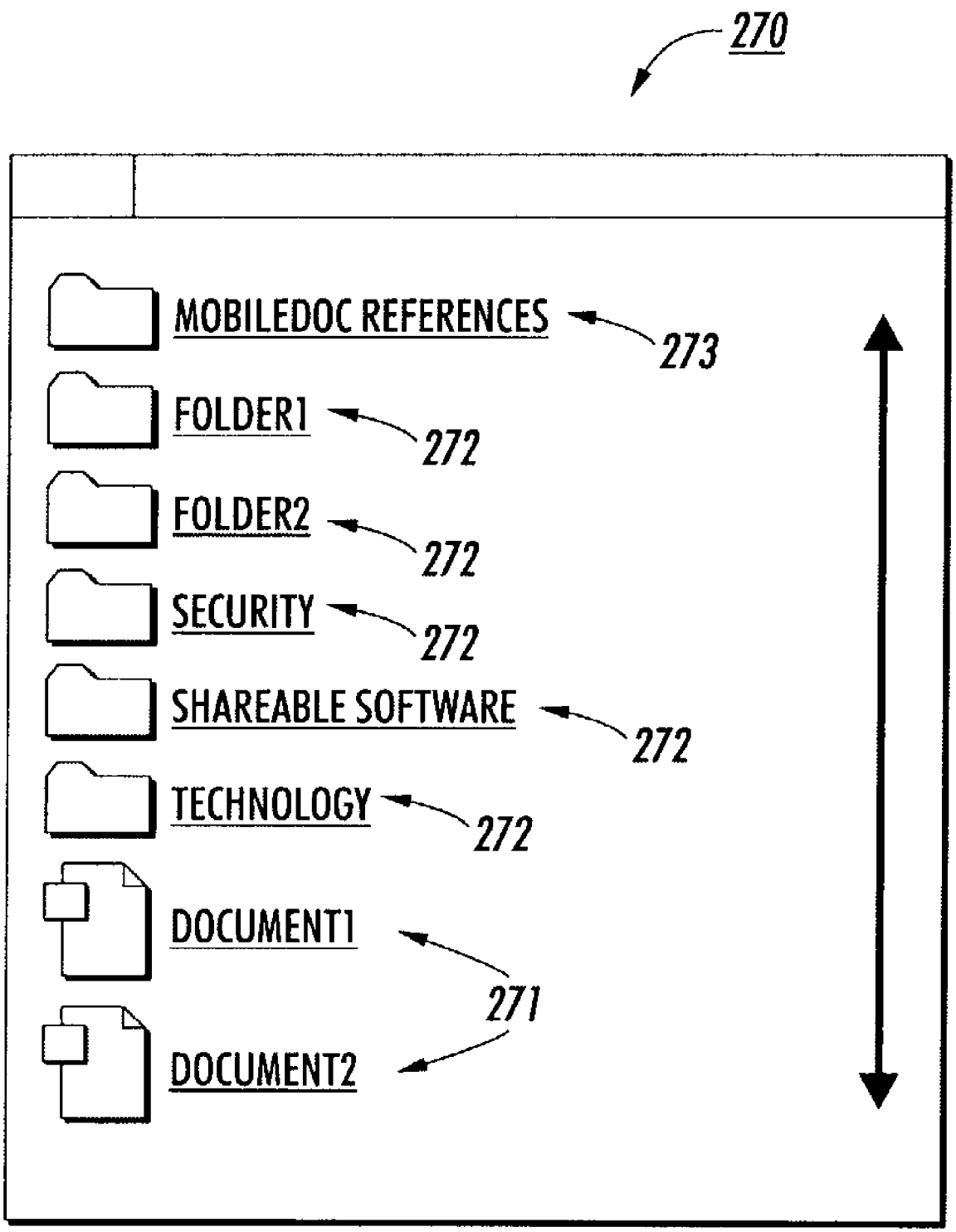
FIG. 6 illustrates one exemplary embodiment of a browser interface screen according to this invention that is usable to obtain document references for documents accessible through a document access server.

FIG. 6 shows one exemplary embodiment of a browser interface screen 270 according to this invention that is usable to obtain document references for documents accessible through a document access server. As shown in FIG. 6, the browser interface screen 270 allows the user to access various documents 271 and/or various folders 272 and/or 273. Various ones of the folders 272 can contain zero, one or more other documents. In contrast, the folder 273 can contain zero, one or more previously-defined document references or document identifiers.

In various exemplary embodiments, selecting a folder icon in the display generated by the document access server such as the icon 273 will cause the display to "drill down" into the folder and thus show its contents. In this manner, it is possible for the user to navigate to any document to which the document access server has access, including documents located on some other device that is reachable through the document access server. In various exemplary embodiments, selecting a document icon appearing within the display generated by the document access server, such as one of the icons 271, will cause the document services interface to appear. In various exemplary embodiments, the document services dialog may overlay the browser window in a manner similar to the way in which the document services dialog window or interface overlays an e-mail reader as shown in FIG. 1. In various exemplary embodiments, when the document services dialog is invoked in this way, the currently selected document identifier or document reference will be associated with the document that the user selected from the display generated by the document access server. In various exemplary embodiments, the user can then invoke any implemented action, such as the actions that are described herein, such as, but not limited to, Fax, Print, Beam, and Add to Pocket. Likewise, the user can select those action options for the selected action, as also described herein, that will be applied against the document indicated by the currently selected document identifier.

In various other exemplary embodiments, the browser can be used to directly view the Internet, or any other known or later developed network, without requiring the document access server to generate the display. In various exemplary embodiments, the user can select the currently displayed page or document, which may be generated using HTML, WML, or other similar techniques for displaying graphical and textual information on the browser. In various exemplary embodiments, the document services dialog window or interface will appear after the currently displayed page or document is selected, with the uniform resource locator (URL) or equivalent identifier for the currently displayed page or document that appears in the browser being used as the current document identifier or document reference. The user can then invoke one of the implemented actions as described above.

Figure 7:
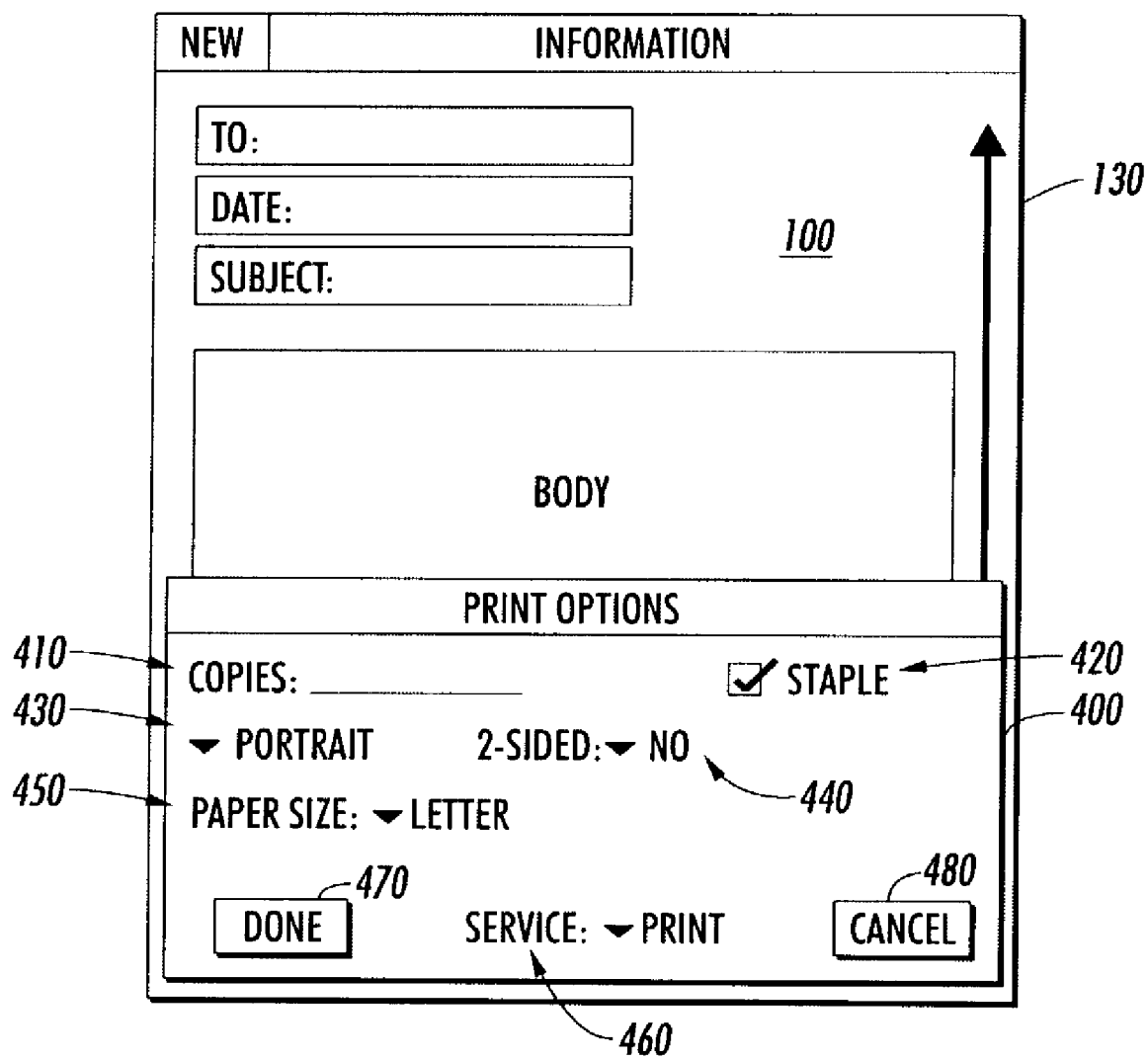
FIG. 7 illustrates one exemplary embodiment of a print options interface according to this invention.

FIG. 7 illustrates one exemplary embodiment of a print options interface 400 in accordance with this invention. As shown in FIG. 7, the print options interface 400 includes a Copies entry field 410 in which the number of printed copies of a selected document is entered. In various exemplary embodiments, the number is entered by manually entering digits into the field 410.

In various exemplary embodiments, the print options interface 400 includes a staple widget 420, such as the illustrated check box, that allows the user to indicate that a document is to be stapled. In various exemplary embodiments, the print options interface 400 contains an Orientation selection widget 430. The Orientation selection widget 430 allows the document orientation, such as portrait or landscape, to be specified. In various exemplary embodiments, the orientation choices are presented in a drop-down list. In various exemplary embodiments, the print options interface 400 includes a Two-Sided selection widget 440 that allows two-sided printing to be turned on or off. In various exemplary embodiments, the Two-Sided selection widget 440 is a check box. In other various exemplary embodiments, the Two-Sided selection widget 440 is implemented using a drop-down list. In various exemplary embodiments, the print options interface 400 contains a Paper Size selection widget 450. In various exemplary embodiments, the Paper Size selection widget 450 is implemented using a drop-down list.

In various exemplary embodiments, the print options interface 400 contains an action selection widget 460 that generally corresponds to the action selection widget 330. In various exemplary embodiments, the available options are presented in a drop-down list that is accessed by selecting the action selection widget 440. In various exemplary embodiments, the selection of an action via the interface 460 invokes an action dialog widget for the selected action. The actions include, but are not limited to, one or more of Fax, Beam or Print.

In various exemplary embodiments, the print options interface 400 contains a Done button 470. Clicking the Done button 470 closes the print options interface 400 and prepares the information contained in the print options interface 400 for communication to the document access server. In various exemplary embodiments, the information includes flags, identifiers, or the like, that are indicative of the print options.

In various exemplary embodiments, the print options interface 400 includes a Cancel button 480. Clicking the Cancel button 480 cancels any selected print options, optionally clears any selected and/or suggested information and returns control back to the document services interface 200.

Figure 8:
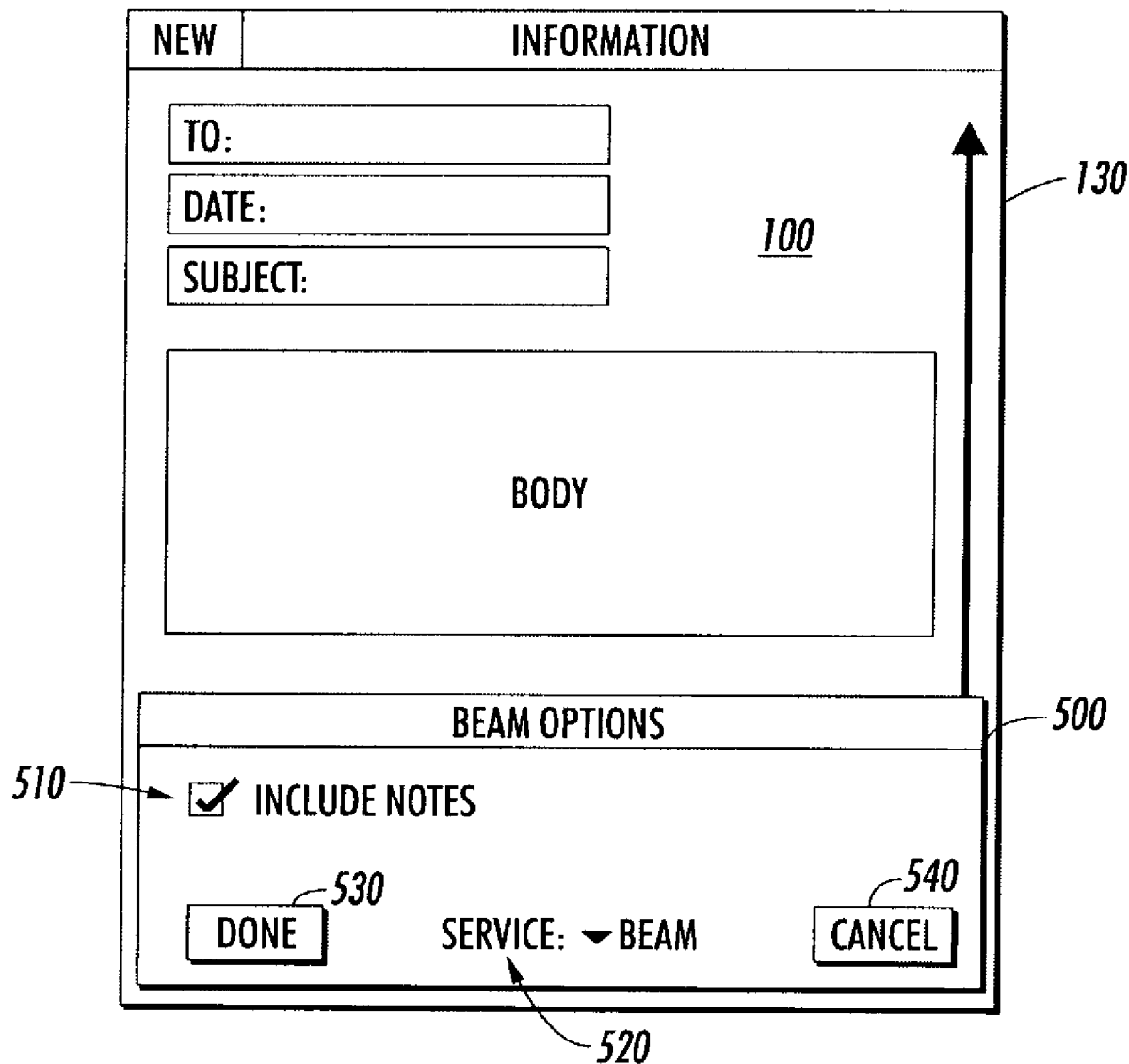
FIG. 8 illustrates one exemplary embodiment of a beam options interface according to this invention.

FIG. 8 illustrates one exemplary embodiment of a beam options interface 500 in accordance with the invention. In mobile information devices, "beaming" generally refers to transmitting information to another mobile information device via an infrared (IR) signal or a radio frequency (RF) signal. For example, one or more software applications enabling use of a document identifier may be beamed from one mobile information device to another. The beam options interface 500 includes options that allow a document or file to be beamed from one mobile information device to another. As shown in FIG. 8, the beam options interface 500 includes an Include Notes selection widget 510. Selecting the Include Notes widget 510 causes any notes relating to the document on file to be beamed to the other mobile information device along with the document or file.

In various exemplary embodiments, the beam options interface 500 contains an action selection widget 520 that generally corresponds to the action selection widget 330. In various exemplary embodiments, the available actions are presented in a drop-down list that is accessed by selecting the action selection widget 520. In various exemplary embodiments, the selection of an action via the interface 550 invokes an action dialog widget for the selected action. The actions include, but are not limited to one or more of Fax, Beam or Print.

In various exemplary embodiments, the beam options interface 500 includes a Done button 530. Clicking the Done button 530 closes the beam options interface 500 and prepares the information contained in the beam options interface 500 when identifying the data to be used in a beam transaction. In various exemplary embodiments, the beam options interface 500 includes a Cancel button 540. Clicking the Cancel button 540 cancels any selected beam options, and returns control back to the document services interface 200.

Figure 9:
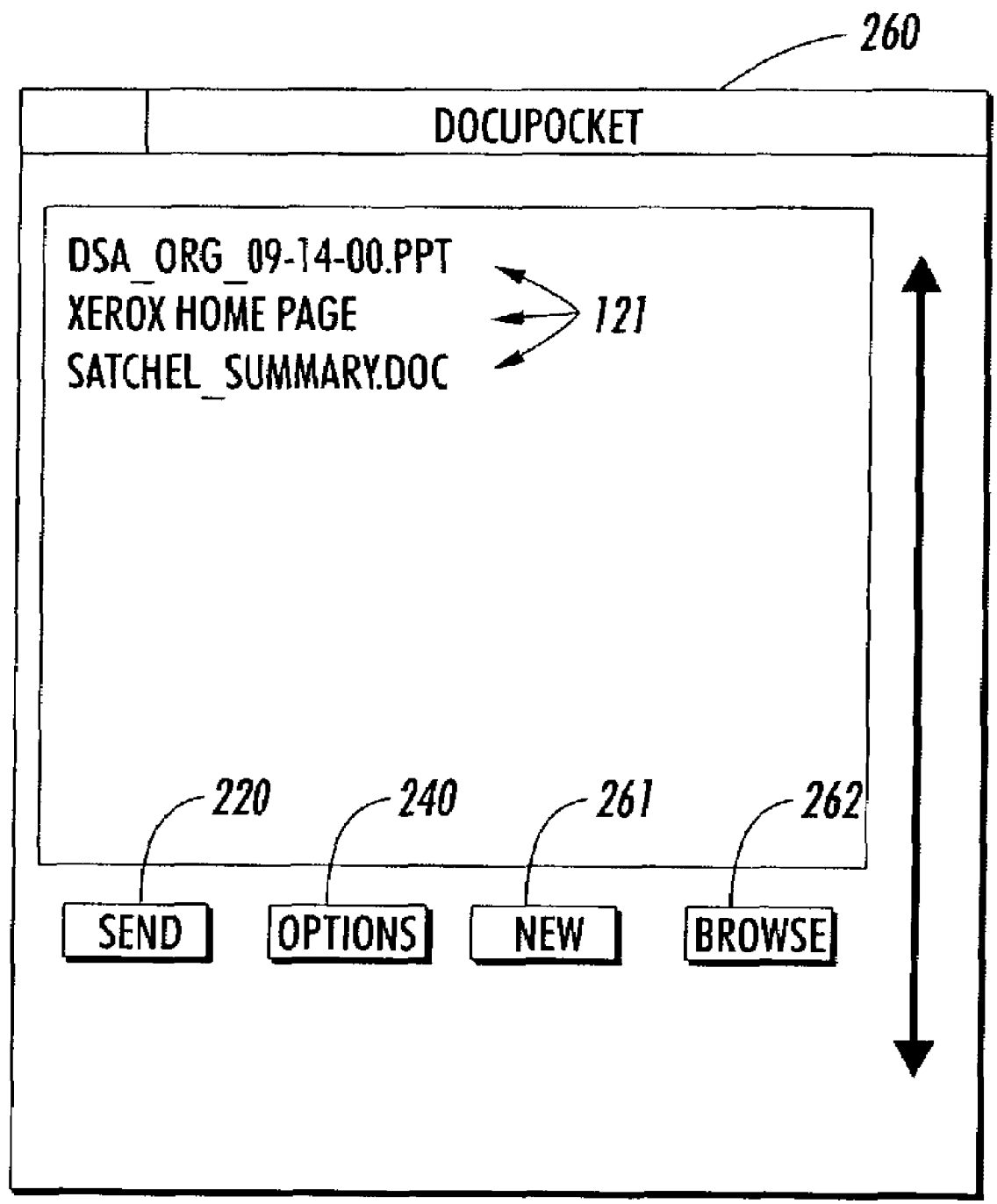
FIG. 9 illustrates one exemplary embodiment of a document reference repository interface screen according to this invention.

FIG. 9 illustrates one exemplary embodiment of a document reference repository screen according to this invention. The document reference repository screen 260 is accessed by selecting the Open Pocket button 220 shown in FIG. 2. As shown in FIG. 9, the document reference repository screen 260 includes any received document references or document identifiers 121 that have been received from the document access server, or that have been beamed from another mobile information device. As shown in FIG. 9, the document reference repository screen 260 includes another instantiation of the Send button 220 and another instantiation of the Options button 240, as well as a New button 261 and a Browse button 262. Selecting the New button 261 allows the user to generate a new unique document reference or document identifier 121.

The New button 261 also accesses a screen that allows a user to enter a document reference for a document that may or may not exist at the time the reference is created. It should be appreciated that, in various exemplary embodiments, there is no special action that has to be taken by the user to associate the new document reference with an actual document. That is; the user just enters the new document reference. Subsequently, if someone tries to use a document reference that points to a document that does not yet exist, an error message can be displayed.

The Browse button 262 allows the user to navigate to documents that are accessible to the document access server. In general, the Browse button 261 opens a browser window to the document access server. The document access server can then display listings of files that are stored on the document access server and/or that the user can reach over on the Internet, or on some other distributed network, through the document access server. Selecting and/or activating an icon representing one of these files that is displayed in the opened browser window causes that file, or, more particularly, a document reference to that file, to become the target of a subsequent "Send" or "Add to Pocket" command. By navigating, or moving from one place to another on the Intranet and/or other distributed network, the user can see icons representing the documents that reside at any particular place. That is, it should be understood that browsing does not necessarily imply that the user is able to see inside the files, although, in various exemplary embodiments, this type of browsing could be enabled as well.

Figure 10:
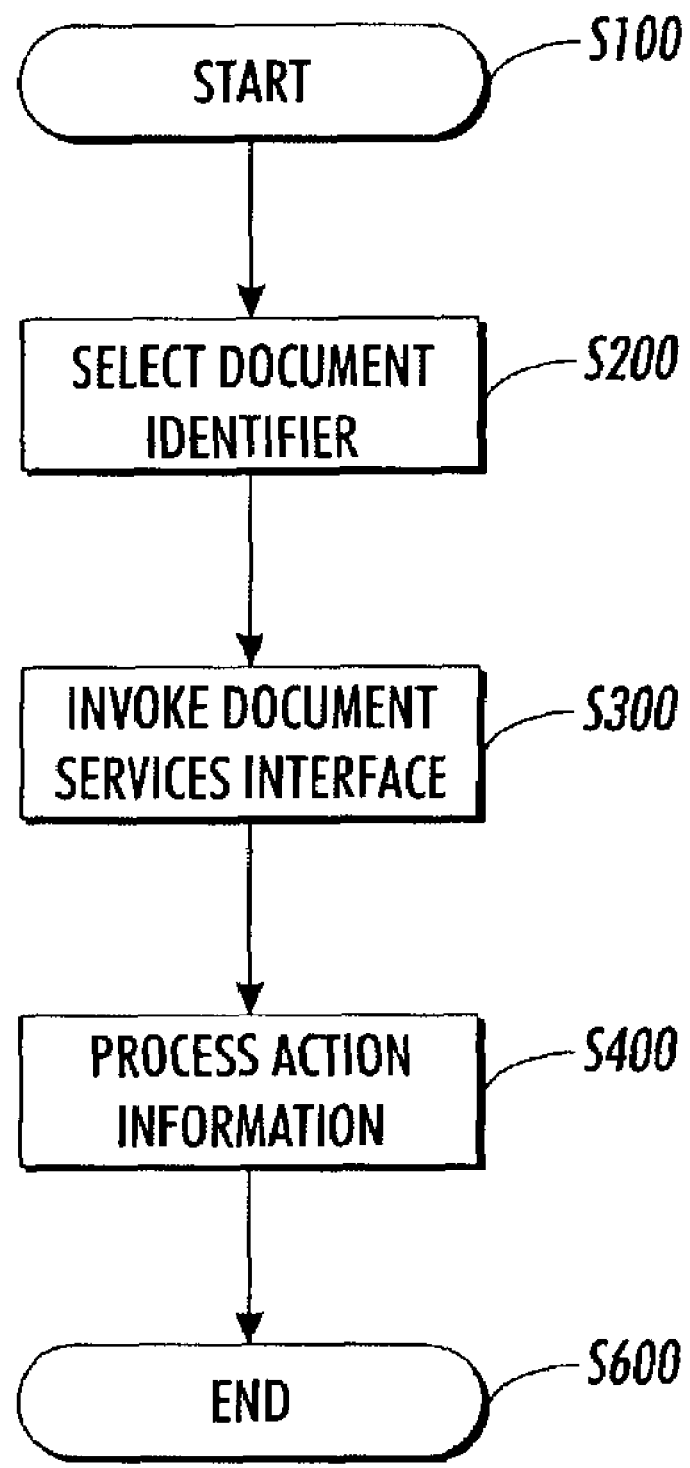
FIG. 10 is a flowchart outlining one exemplary embodiment of a method for interacting with document services from mobile computer applications according to this invention.

FIG. 10 is a flowchart outlining one exemplary embodiment of a method for interacting with document services from a mobile information device. As shown in FIG. 6, operation of the method begins in step S100, and continues to step S200, where a document identifier or document reference is selected. The identifier may be in the body of an e-mail document or any other appropriate document, as outlined above. Alternately, as outlined above, the identifier may be stored and/or presented in a document identifier database or repository on the mobile information device. Then, in step S300, a document services interface application is invoked. Invoking the document services interface application may be implemented using any appropriate method. Thus, the interface may be invoked by selecting a globally-available menu item. Alternately, the interface may be invoked upon selecting the document identifier or document reference selected in step S200. Operation then continues to step S400.

In s step S400, any action information relating to an action to be performed on the document corresponding to the selected document identifier is processed. In various exemplary embodiments, the processing of the action information occurs in three sub-steps. First, an action identifier is determined. A unique action identifier is associated with each action. In various exemplary embodiments, the action identifier is a textual representation for the action, for example, the text string "FAX." In various exemplary embodiments, the action identifier is a numeric identifier associated with the action. As indicated in FIGS. 3-9, in various exemplary embodiments, these actions include faxing the document, printing the document, and/or beaming or transmitting the document to another mobile information device and can include any other appropriate action.

It should be appreciated that assigning an action identifier is simply one way of processing the action information. Thus, in various other exemplary embodiments, a path or thread of execution that is unique for each action is created or invoked, so that the context would indicate what was supposed to be done at each stage of processing the action information.

Next, in the second sub-step of step S400, any action options for the selected action are selected. Similar to the actions, each action option is associated with an option identifier. Then, in the third sub-step of step S400, the selected document identifier, the selected action identifier, and any selected action options are transmitted to the document access server. Next, in step S600, operation of the method ends.

Figure 11:
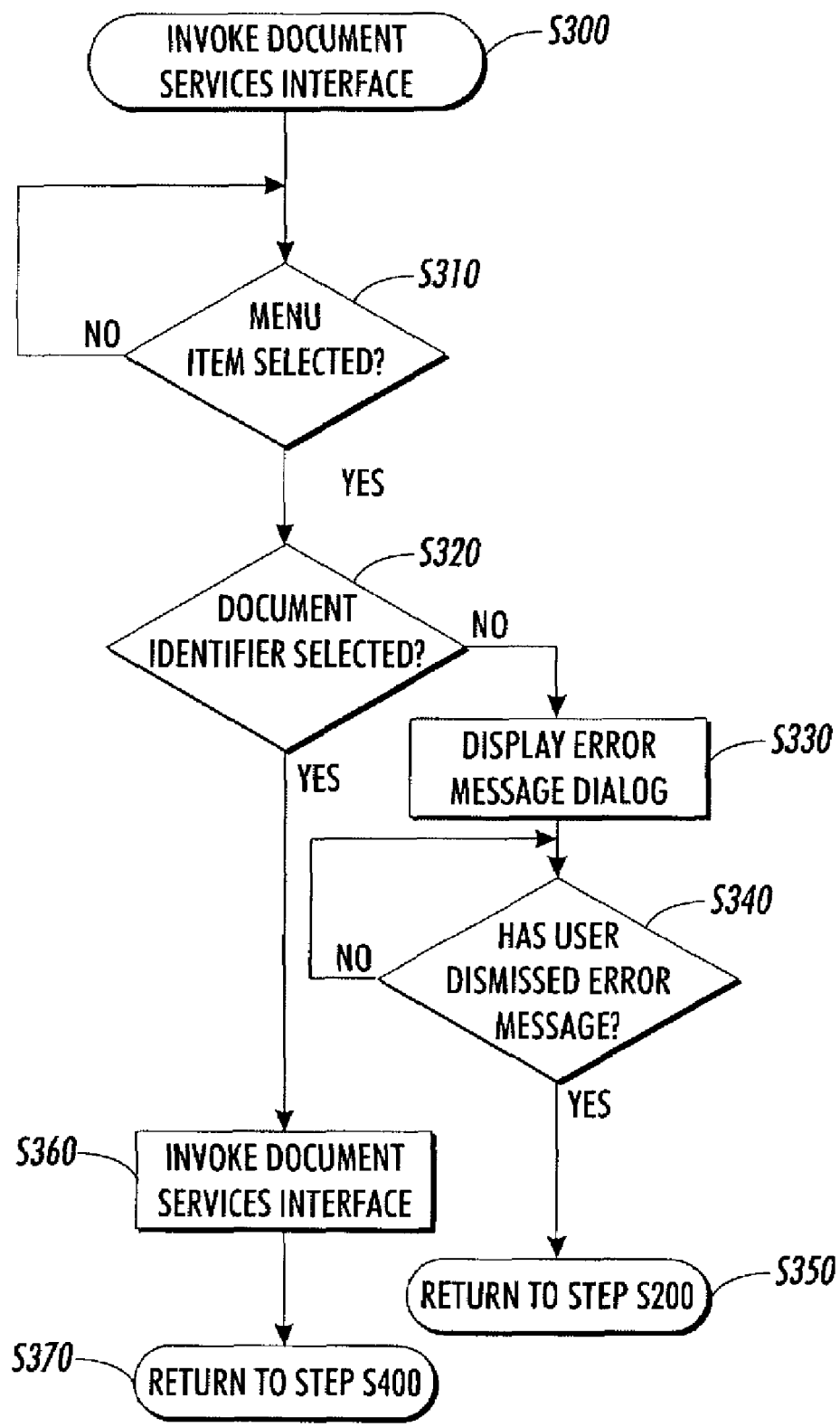
FIG. 11 is a flowchart outlining in greater detail one exemplary embodiment of the method for invoking a document services interface of FIG. 10 according to the invention.

FIG. 11 is a flowchart outlining in greater detail one exemplary embodiment of the method for invoking a document services interface of FIG. 9 in accordance with the invention. As shown in FIG. 11, operation of the method begins in step S200, and continues to step S310, where a determination is made whether a services menu item or other appropriate interface widget that invokes the document services interface has been selected. If so operation continues to step S320. Otherwise, operation jumps back to step S310.

In step S320, a determination is made whether a document identifier or document reference has been selected. If so, operation jumps to step S360. Otherwise, operation continues to step S330. In step S330, an error message dialog box or other appropriate error message interface widget is displayed to the user to advise the user that a document identifier or document reference needs to be selected before the document services interface is invoked. Then, in step S340, a determination is made whether the user has dismissed the displayed error message. If so, operation continues to step S350, where operation jumps back to step 200. Otherwise, operation returns to step S340. In contrast, in step S360, the document services interface is invoked based on the selected document identifier. Operation then continues to step S370, where operation of the method returns to step S400.

Figure 12:
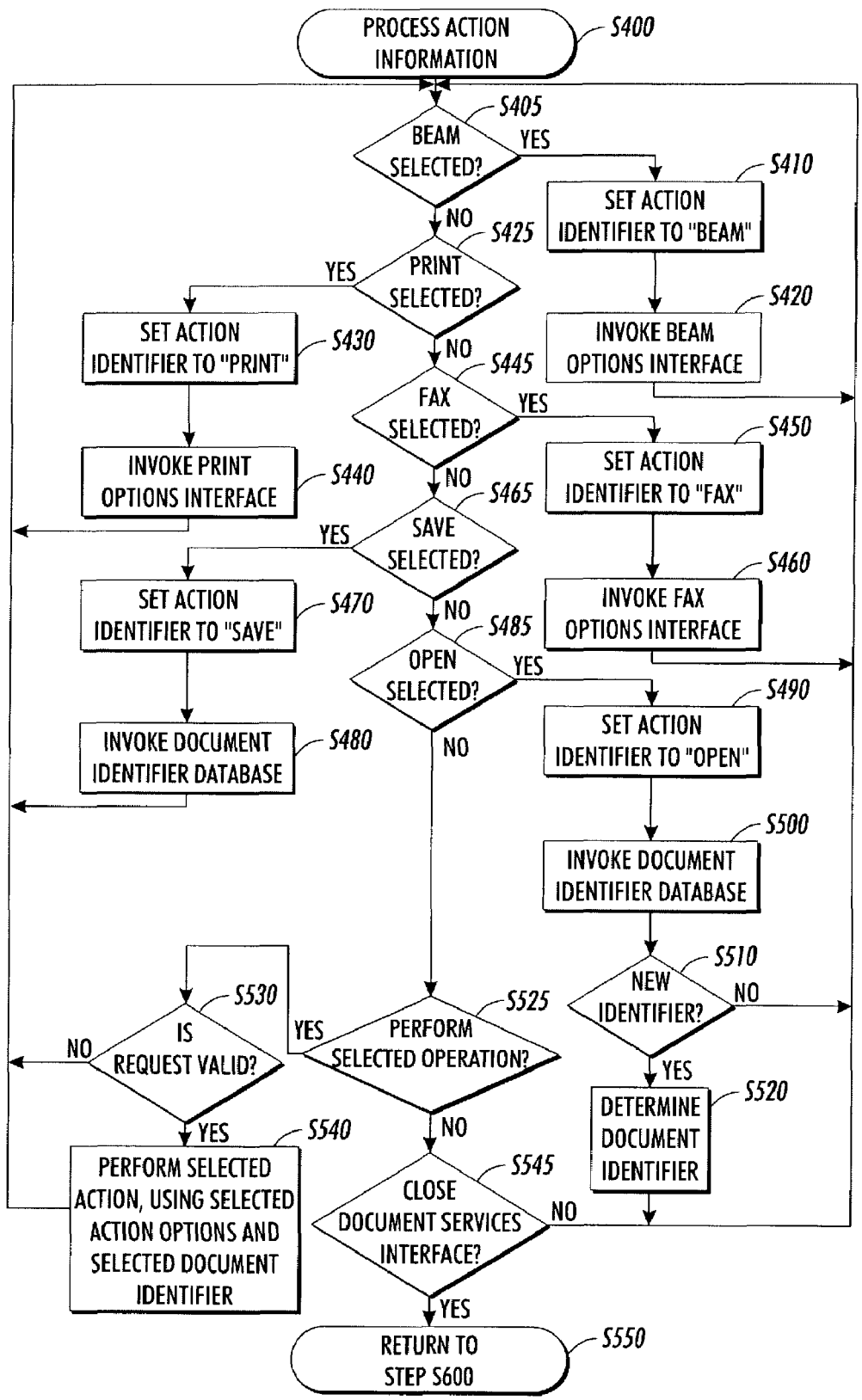
FIG. 12 is a flowchart outlining in greater detail one exemplary embodiment of the method for determining one or more actions to be performed on a document of FIG. 10 according to this invention.

FIG. 12 is a flowchart outlining in greater detail one exemplary embodiment of the method for processing action information of FIG. 6 in accordance with the invention. As shown in FIG. 12, operation of the method begins in step S400, and continues to step S405, where a determination is made whether a beam action has been selected using a document services interface. If so, operation continues to step S410. Otherwise, operation jumps to step S425. In step S410, the action identifier is set to "BEAM." Next, in step S420, a beam options interface is invoked. Operation then returns back to step S405.

In step S425, a determination is made whether a print action has been selected using a document services interface. If so, operation continues to step S430. Otherwise, operation jumps to step S445. In step S430, the action identifier is set to "PRINT." Then, in step S440, a print options interface is invoked. Operation then returns back to step S405.

In step S445, a determination is made whether a fax document action has been selected using the document services interface. If so, operation continues to step S450. Otherwise, operation jumps to step S465. In step S450, the action identifier is set to "FAX." Next, in step S460, a fax options interface is invoked. Operation then returns back to step S405.

In step S465, a determination is made whether a command to save a selected document identifier has been selected using the document services interface. If so, operation continues to step S470. Otherwise, operation jumps to step 485. In step S470, the action identifier is set to "SAVE." Then, in step S480, a document identifier database application is invoked. In various exemplary embodiments, in step S480, the document identifier may be saved to a document identifier database or repository on the mobile information device, such as the document identifier database or repository discussed above with respect to FIG. 9. Operation then returns back to step S405.

In step S485, a determination is made whether a command to retrieve a previously stored document identifier has been selected using the document services interface. If so, operation continues to step S490. Otherwise, operation jumps to step S525. In step S490, the action identifier is set to "OPEN."

Next, in step S500, a document identifier database application is invoked. In various exemplary embodiments, in step S500, a previously stored document identifier may be retrieved from a document identifier database application. Next, in step S510, a determination is made whether a document identifier has been selected in step S500. If so, operation continues to step S520. Otherwise, operation returns back to step S405. In step S520, the selected document identifier is determined. Operation then also returns to step S405.

In step S525, a determination is made whether the determined action is to be performed, such as sending a command to the document access server if the action is fax or print, or beaming the selected information if the action is beam. If so, operation continues to step S530. Otherwise, operation jumps to step S545. In step S530, a determination is made whether the request is valid. In various exemplary embodiments, a request is valid if it includes a document identifier, an action identifier, and any action option identifiers necessary to complete the request. If the request is valid, operation continues to step S540. Otherwise, operation returns to step S405. In step S540, the document identifier, the action identifier and the selected action options, if any, are performed. For example, for the fax and print actions, a command and any necessary auxiliary information, such as facsimile information and any facsimile cover sheet, is transmitted to the access server for further processing. For the beam action, the document reference or identifier is beamed to the receiving device, such as another mobile information device or a personal computer or laptop that is beamable. Operation then again returns to step S405.

In step S545, a determination is made whether the document services interface has been closed. If not, then operation again returns to step S405. Otherwise, operation continues to step S550, where operation of the method returns to step S600.

Figure 13:
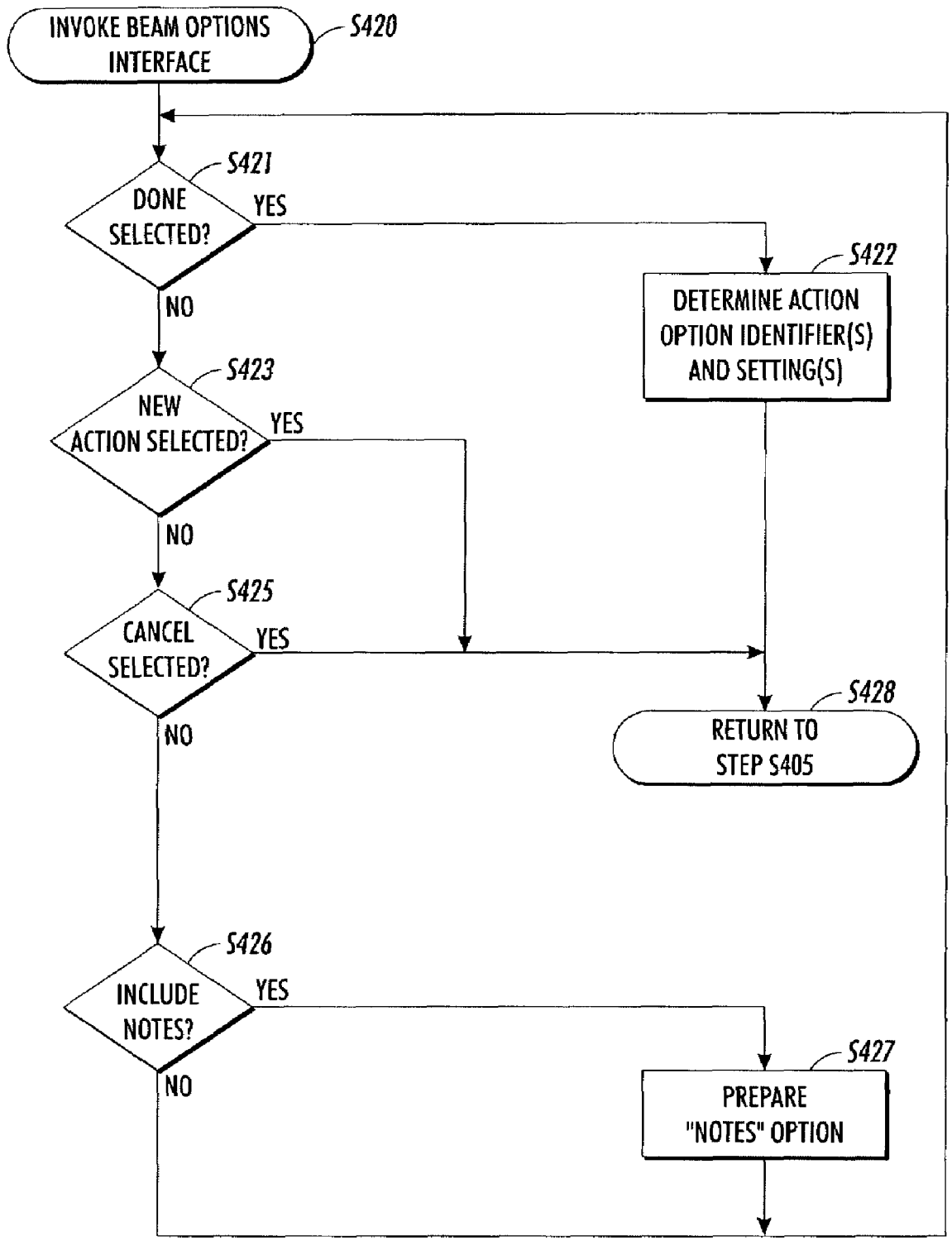
FIG. 13 is a flowchart outlining in greater detail one exemplary embodiment of the method for implementing an exemplary beam options interface of FIG. 12 according to this invention.

FIG. 13 is a flowchart outlining one exemplary embodiment of the method for invoking the beam options interface of FIG. 12 in accordance with the invention. As shown in FIG. 12, operation of the method begins in step S420, and continues to step S421, where a determination is made whether the user has selected to complete the process presented in the beam options interface. If so, operation continues to step S422. Otherwise, operation jumps to step S423. In step S422, the selected action option identifier(s) and setting(s) are determined. Operation then jumps to step S428.

In step S423, a determination is made whether the user has selected a different action via the action selection interface. For example, in the exemplary embodiments of the beam options interface 500 shown in FIG. 5, commands to either fax or print the document are available. If the user has selected a different action, then operation continues to step S428. Otherwise, operation continues to step S425. In step S425, a determination is made whether the user has cancelled the action options interface. If not, operation jumps to step S428. Otherwise, operation continues to step S426.

In step S426, a determination is made whether the user has decided to include notes associated with the selected document in the beaming process. If so, operation continues to step S427. Otherwise, operation returns to step S421. In step S427, any associated notes are prepared for beaming. Operation then again returns to step S421. In contrast, in step S428, operation of the method returns to step S405. In various exemplary embodiments, any action option identifiers and settings determined in step S422 are passed back to the document services interface for further processing.

Steps S440 and S460 use sub-steps similar to those shown in FIG. 13. The methods vary only in the sub-steps implementing the selection of action options unique to either a PRINT option or a FAX option. The implementation details for the sub-steps are well-known to those of skill in the art.

Figure 14:
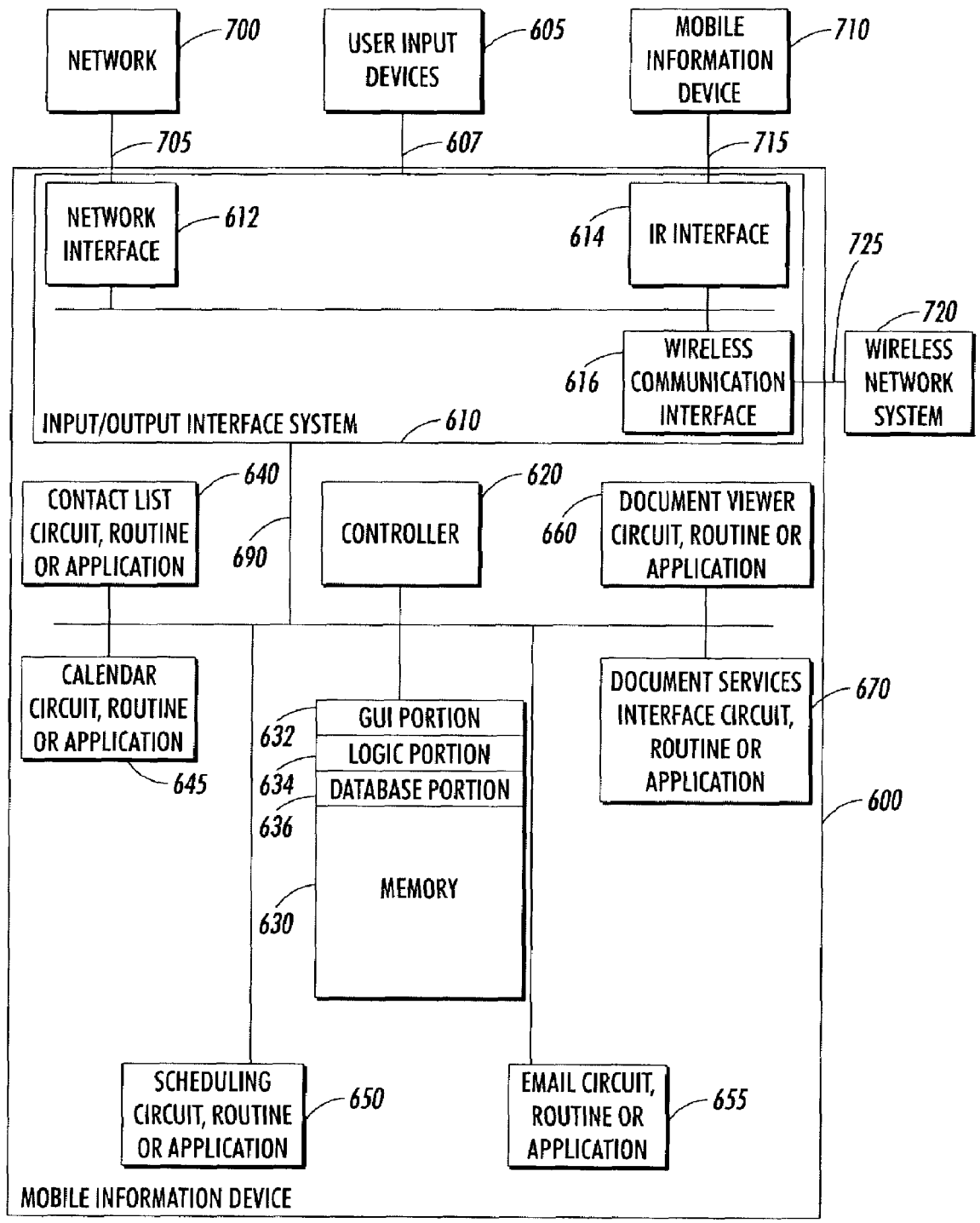
FIG. 14 is a block diagram showing one exemplary embodiment of a document services interface system according to this invention.

FIG. 14 shows an exemplary embodiment of a mobile information device 600 that includes the document services interface according to this invention. As shown in FIG. 14, the document services interface system 600 includes an input/output interface 610, a controller 620, a memory 630, one or more user input devices 605, a network interface 612, an IR interface 614, a remote communication interface 616, a contact list circuit, routine or application 640, a calendar circuit, routine or application 645, a scheduling circuit, routine or application 650, an e-mail circuit, routine or application 655, a document viewer circuit, routine or application 660, a document service interface circuit, routine or application 670, and a uniform document identifier extraction circuit, routine or application 680, each interconnected by one or more data/control busses or application programming interfaces 690.

The mobile information device 600 can be implemented using any known or later-developed type of mobile information device. Thus, the one or more user input devices 605 may include a touch pad, a touch screen, or a keyboard. The network interface 612 enables the mobile information device to communicate with an external network 700 via a link 705. The IR interface 614 enables the mobile information device 600 to beam, via an IR communication link 715, documents and software to a second mobile information device 710. The remote communication interface 616 enables the mobile information device 600 to communicate with a wireless network system 720 via a wireless communication link 725. Thus, the mobile information device 600 may be in communication with, for example, other mobile information devices and remote computer systems, via the wireless network system 720. The input/output interface 605 includes the user input devices 605, the network interface 612, the IR interface 614, and the remote communication interface 616.

In various exemplary embodiments, the contact list circuit, routine or application 640 enables a user of the mobile information device to store and retrieve names, addresses and telephone numbers. In various exemplary embodiments, the calendar circuit, routine or application 645 enables a user of the mobile information device to keep track of appointments, time-sensitive notes, and/or deadlines. In various exemplary embodiments, the scheduling circuit, routine or application 650 enables a user of the mobile information device to assign and prioritize tasks.

In various exemplary embodiments, the e-mail circuit, routine or application 655 enables a user of the mobile information device to read and write e-mail. In other exemplary embodiments of the e-mail circuit, routine or application 655, e-mail may be sent to or received from remote locations via the network interface 612, the IR interface 614, and/or the remote communication interface 616. In various exemplary embodiments, the document viewer circuit, routine or application 660 enables a user of the mobile information device to view mobile information device-enabled documents. In various exemplary embodiments, the document service interface circuit, routine or application 660 also enables a user of the mobile information device to read and write a word-processor style document.

The memory 630 includes one or more of a graphical user interface (GUI) portion 632, an application logic portion 634 and a database portion 636. In various exemplary embodiments, the graphical user interface portion 632 stores logic and data necessary to display the graphical user interfaces of the invention. In various exemplary embodiments, the application logic portion 634 holds application code and data required to enable the various graphical user interfaces of the invention to interact with the operating system and the other graphical user interfaces of the mobile information device. In various exemplary embodiments, the database portion 636 includes a document identifier database and an action identifier database. The action identifier database stores identifiers relating to actions that can be executed to an electronic document at a remote server. The document identifier database stores the identifiers for electronic documents. In various exemplary embodiments, the document identifier database stores records comprising unique document identifiers and/or user-friendly descriptive text. The action identifier database and the document identifier database are utilized by the document service interface circuit, routine or application 670 and the uniform document identifier extraction circuit, routine or application 680. In various embodiments, the memory 630 stores one or more control routines used by the controller 620 to operate the document services interface system.

The memory 630 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable for fixed memory can be implemented using any one or more of ROM, PROM, EPROM, EEPROM, an optical ROM disk, such as CD-ROM or DVD-ROM disk, and disk drive or the like.

In operation, in various exemplary embodiments, the mobile information device 600 receives an e-mail file whose message body contains one or more document identifiers. The e-mail document may be received from one or more of the network 700 via the network interface 612, the wireless network system 720 via the wireless communication interface 616, and/or a second mobile information device 710 via the IR interface 614. The network interface 612, the IR interface 614, and the wireless communication interface 616, as part of the input/output interface system 610, operate under control of the controller 620.

The received e-mail file is stored in the memory 630. In various exemplary embodiments of the invention, the uniform document identifier extraction circuit, routine or application 680, under control of the controller 620, extracts the uniform identifier, and possibly extracts a user-friendly text string identifying the electronic file attachment from the received e-mail file, and stores the extracted information in the database portion 636. In various other exemplary embodiments, the uniform identifier and the user-friendly text string are not extracted from the e-mail file. In these exemplary embodiments, the uniform identifier and the user-friendly text string remain a part of the received e-mail file stored in memory 630.

A user of the mobile information device 600 accesses the e-mail file via either the e-mail circuit, routine or application 655 or the document viewer circuit, routine or application 660, under control of the controller 620.

A user, through one or more user input devices 605, invokes a document services interface. The document services interface circuit, routine or application 670, under control of the controller 620, enables the user, via the one or more user input devices 605, to select one or more actions to be performed on the electronic file attachment identified by the unique identifier. Moreover, the document services interface circuit, routine or application 670, under control of the controller 620, enables the user, via one or more user input devices 605, to select one or more action options modifying or further defining the selected action.

The unique identifier, action identifier, and one or more action option identifiers may then be stored in the memory 630 by the document services interface circuit, routine or application 670, under control of the controller 620, for later transmittal to the access service system. The unique identifier, action identifier, and the one or more action option identifiers are transmitted to an access server system via either the network interface 612, the IR interface 614, or the wireless communication interface 616, each under control of the controller 620.

It should be understood that each of the circuit, routine or applications shown in FIG. 14 can be implemented as physically distinct hardware circuits within an ASIC, or using an FPGA, a PDL, a PLA or a PAL, a digital signal processor, or using discrete logic elements or discrete circuit elements. The particular form each of the circuits or routines shown in FIG. 14 will take is a design choice and will be obvious and predictable to those skilled in the art.

Figure 15:
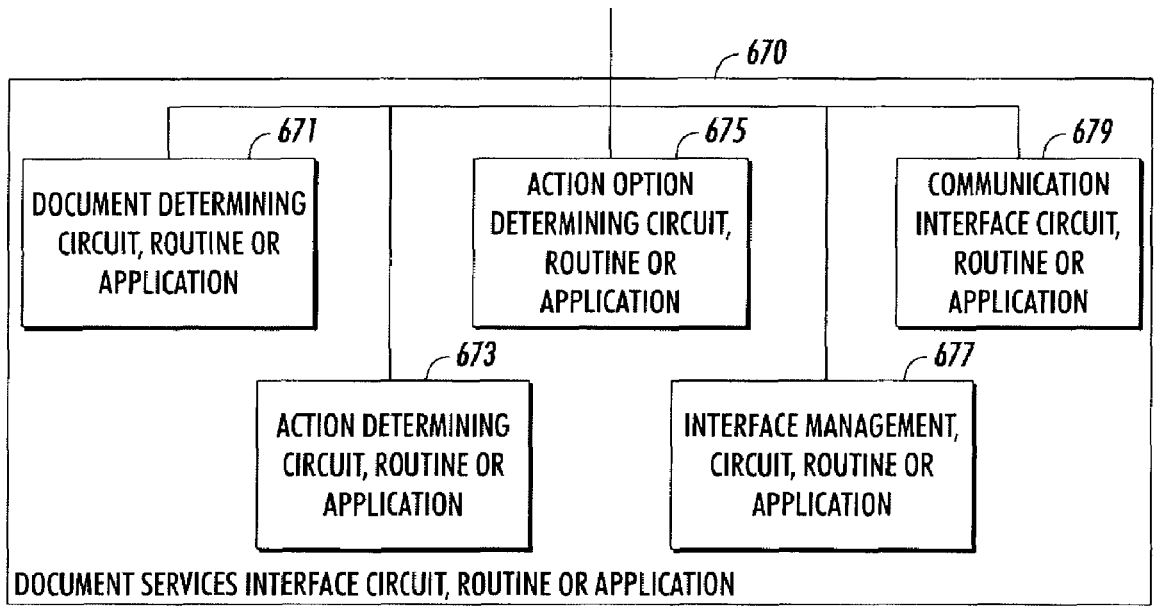
FIG. 15 is a block diagram showing in greater detail one exemplary embodiment of the document services interface circuit, routine or application of FIG. 10 according to this invention.

FIG. 15 shows in greater detail one exemplary embodiment of the document services interface circuit, routine or application 670 in accordance with the invention. As shown in FIG. 15, the document services interface circuit, routine or application 670 includes one or more of a document determining circuit, routine or application 671, an action determining circuit, routine or application 673, an action option determining circuit, routine or application 675, an interface management circuit, routine or application 677, and/or a communication interface circuit, routine or application 679.

The document determining circuit, routine or application 671, under control of the controller 620 of FIG. 14, determines the unique identifier associated with each electronic document identified as an attachment to an e-mail file. The action determining circuit, routine or application 673, under control of the controller 620 of FIG. 14, determines an action identifier available for selection or corresponding to a selected action. The action option determining circuit, routine or application 675, under control of the controller 620 of FIG. 14, determines one or more action option identifiers defining or modifying an action determined by the action determining circuit, routine or application 673. The interface management circuit, routine or application 677, under control of the controller 620 of FIG. 14, manages the display of the one or more graphical user interface embodiments of this invention, as well as the event flow of the interface embodiments of this invention. The communication interface circuit, routine or application 679, under control of the controller 620 of FIG. 14, enables the transmission of the selected identifiers with an access server system, as well as the processing by the document services interface circuit, routine or application 670 of received e-mail files.

Figure 16:
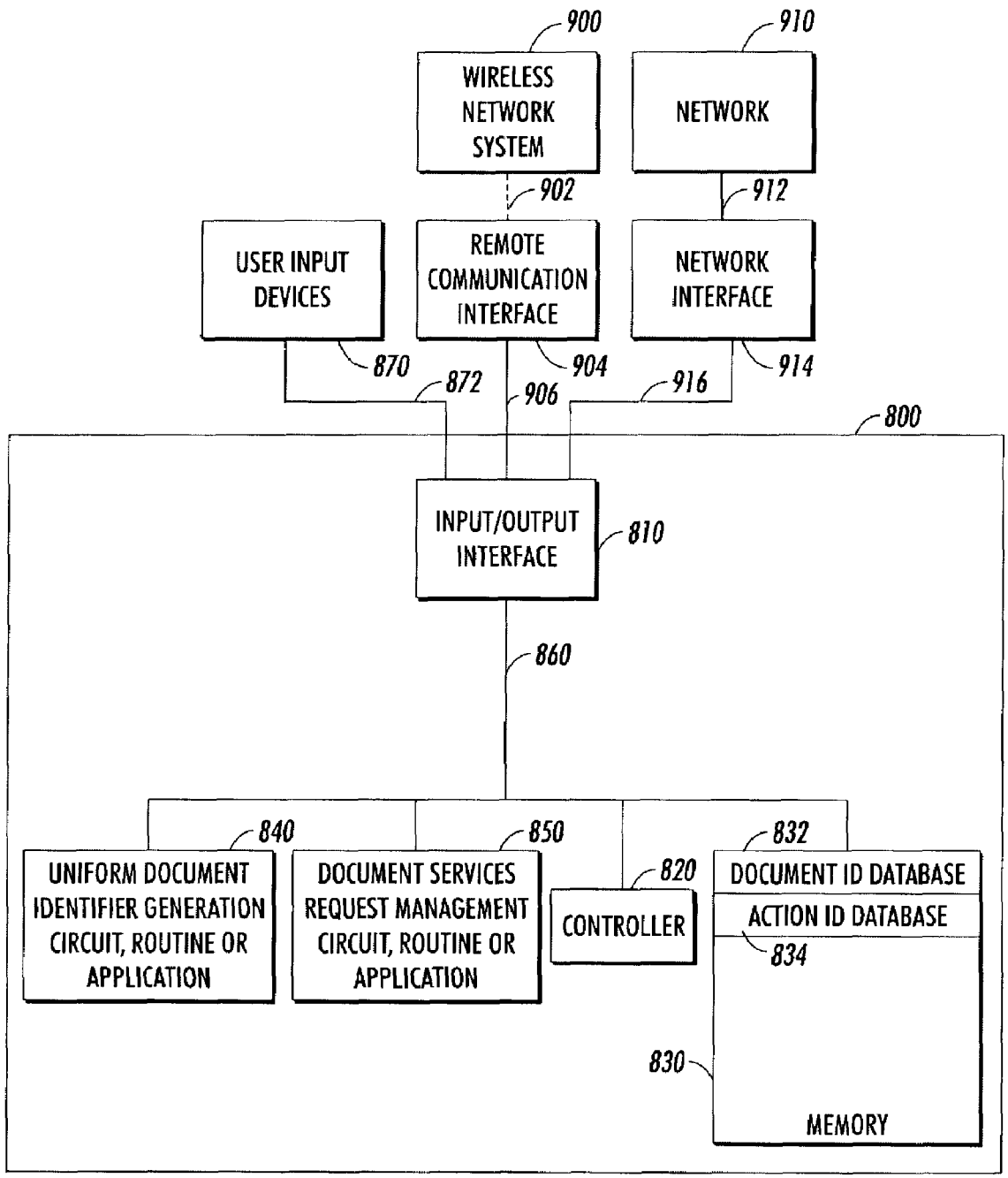
FIG. 16 is a block diagram showing one exemplary embodiment of a document access server system according to this invention.

FIG. 16 shows one exemplary embodiment of an access server system 800 that is usable with the document identifiers or references 121 and the document services interface 100 according to this invention. As shown in FIG. 16, the access server system 800 includes an input/output interface 810, a controller 820, a memory 830, a document services request management circuit, routine or application 850, and a uniform document identifier generation circuit, routine or application 840, each interconnected by one or more data/control busses or application programming interfaces 860. As further shown in FIG. 16, one or more user input devices 870 are connected over one or more links 872 to the input/output interface 810. Additionally, a network interface 914 is connected to the input/output interface 810 over a link 916. The network interface 914 enables the input/output interface 810 to communicate with an external network 910 over one or more links 912. Further, a remote communication interface 904 is connected to the input/output interface 904 over a link 906. The remote communication interface 904 enables the input/output interface 810 to communicate with a wireless network 900 over a link 902.

Each of the links 872, 906, 902, 916 and 912 is implemented using any known or later developed device or system for connecting the corresponding one or more user input devices 870, the network interface 914, the remote communication interface 904, the external network 910, and the wireless network system 900, respectively, to the uniform document identifier generation system 800, including a direct cable connection, a connection over a wide area network, a connection over an intranet, a connection over the Internet, or a connection over any other distributed processing network or system. In general, each of the links 872, 902, 906, 912 and 916 can be any known or later-developed connection system or structure.

The input/output interface 810 inputs data from the network 910, the wireless network system 900 and/or the one or more user input devices 870 and outputs data to the network 910 and/or the wireless network system 900. The input/output interface 810 also outputs data to one or more of the controller 820, the memory 830, the document services request management circuit, routine or application 850, and/or the uniform document identifier generation circuit, routine or application 840 and receives data from one or more of the controller 820, the memory 830, the document services request management circuit, routine or application 850, and/or the uniform document identifier generation circuit, routine or application 840.

The memory 830 includes one or more of a document identifier database portion 832 and an action identifier database portion 834. In various exemplary embodiments, the action identifier database portion 834 stores identifiers usable to identify actions that can be executed on a computer file located on the access server or at a remote server by any circuit, routine or application executed from the document access server. The document identifier database portion 832 stores identifiers sent to mobile information devices usable to identify computer files. In various exemplary embodiments, the document identifier database portion 832 stores records comprising unique document identifiers and user-friendly descriptive text. The action identifier database portion 834 and the document identifier database portion 832 are used by the document services request management circuit, routine or application 850, and/or the uniform document identifier generation circuit, routine or application 840. In various embodiments, the memory 830 stores one or more control routines used by the controller 820 to operate the uniform document identifier generation system 800.

The memory 830 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

In operation, in various exemplary embodiments, the access service system 800 receives an e-mail document and one or more associated document identifiers or references from either the wireless network system 900 or the network 910 via the remote communication interface 904 or the network interface 914, respectively. The remote communication interface 904 and network interface 914 are under control of the controller 820.

The received e-mail document, including the one or more associated electronic documents, is stored in the memory 830 under control of the controller 820. The document services request management circuit, routine or application 850, under control of the controller 820, determines whether the e-mail document is addressed to a recipient mobile information device (MID) that is not able to process the one or more associated electronic documents. If so, the uniform document identifier generation circuit, routine or application 840, under control of the controller 820, generates a uniform document identifier for each of the one or more associated electronic documents. The generated uniform document identifiers are stored in a document ID database 832 of the memory 830 in such a manner as to relate the uniform identifier to the one or more associated electronic documents.

Next, the document services request management circuit, routine or application 850 inserts the one or more uniform document identifiers into the message body of the e-mail document, such as, for example, at the end of the e-mail body. The e-mail document, with the document identifiers or references, is then transmitted via the remote communication interface 904 or the network interface 914 to the mobile information device (MID).

In various exemplary embodiments, the access service system 800 can also receive a request from a mobile information device (MID) including a unique document identifier, an action identifier, and one or more action option identifiers. The request is received by either the wireless network system 900 or the network 910 from the remote communication interface 904 or the network interface 914, respectively, and is stored in memory 830, under control of the controller 820.

The document services request management circuit, routine or application 850, under control of the controller 820, determines an electronic document that corresponds to the received unique document identifier by querying the document ID database or repository 832. Further, the document services request management circuit, routine or application 850, under control of the controller 820, determines a corresponding action and one or more corresponding action options by querying the action ID database 834. Depending on the selected actions, the document services request management circuit, routine or application 850, under control of the controller 820, controls an application capable of implementing the determined action so that the determined action is performed on the electronic file attachment identified by the received unique document identifier.

It should be understood that each of the circuit, routine or applications shown in FIG. 16 can be implemented as physically distinct hardware circuits within an ASIC, or using an FPGA, a PLD, a PLA or a PAL, a digital signal processor, or using discrete logic elements or discrete circuit elements. The particular form each of the circuits or routines shown in FIG. 12 will take is a design choice and will be obvious and predictable to those skilled in the art.

While this invention has been described in conjunction with the exemplary embodiments outlined above, it is evidenced that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for enabling an action on an electronic document using a mobile information device having a document service interface, the method comprising:
receiving a selection of a document reference with which a first electronic document stored remote from the mobile information device is associated by one of:
   a. opening a second electronic document stored at the mobile information device that contains the document reference; or
   b. opening a document reference repository at the mobile information device that contains the document reference;
invoking the document services interface on the mobile information device after receiving the selection of the document reference;
receiving, at the document service interface, an action to be performed on the first electronic document by an access device capable of performing the action; and
transmitting, from the mobile information device to the access device, the selected document reference associated with the first electronic document and the received action to be performed at the access device, wherein
the mobile information device is not capable of performing the action on the first electronic document,
the document reference is the first electronic document's URL, and
the mobile information device commands the performing of the action on the first electronic document at the access device by transmitting the selected document reference without transmitting the first electronic document to the access device.

2. The method of claim 1, wherein the document reference repository is stored on the mobile information device.

3. The method of claim 1, wherein the document reference repository is stored on an access device.

4. The method of claim 1, wherein receiving the action to be performed on the first electronic document further comprises receiving a selection of the action to be performed using the document services interface.

5. The method of claim 1, wherein receiving the action to be performed on the first electronic document further comprises invoking an action option interface usable to select at least one option associated with the selected action.

6. The method of claim 5, wherein the action option interface contains action options corresponding to the selected action.

7. The method of claim 1, wherein the selected document reference and the action to be performed are transmitted from the mobile information device to the access device via a second mobile information device.

8. A mobile information device, the mobile information device performing the method of claim 1.

9. An information storage medium, comprising a program, the program capable of executing in a processor and performing the method of claim 1.

10. A method for transferring a document reference to an electronic document from a first mobile information device to a second mobile information device, so as to enable an action on a first electronic document using the second mobile information device, the first mobile information device having a document service interface, the method comprising:
receiving, at the first mobile information device, a document reference, with which a first electronic document stored remote from the first mobile information device is associated by one of:
   a. opening a second electronic document stored at the first mobile information device that contains the document reference; or
   b. opening a document reference repository at the first mobile information device that contains the document reference;
invoking, at the first mobile information device, the document services interface after receiving the selection of the document reference;
transmitting the selected document reference associated with the first electronic document from the first mobile information device to the second mobile information device using the document service interface, such that the document reference and an action to be performed on the first electronic document are transmitted from the second mobile information device to an access device capable of performing the action on the first electronic document, wherein
the first and second mobile information devices are not capable of performing the action on the first electronic document,
the document reference is the first electronic document's URL, and
the mobile information device commands the performing of the action on the first electronic document at the access device by transmitting the selected document reference without transmitting the first electronic document to the second mobile device.

11. The method of claim 10, wherein receiving the document reference comprises receiving a selection of the document reference.

12. The method of claim 10, wherein the document reference repository is stored on the first mobile information device.

13. The method of claim 10, wherein the document reference repository is stored on an access device.

14. The method of claim 10, wherein receiving the document reference comprises:
receiving a selection of the first electronic document; and
generating the document reference based on the selected first electronic document.

15. The method of claim 10, wherein the first electronic document is accessible through the access device.

16. The method of claim 10, wherein transmitting the document reference comprises wirelessly beaming the document reference directly from the first mobile information device to the second mobile information device.

17. A mobile information device, the mobile information device performing the method of claim 10.

18. An information storage medium, comprising a program, the program capable of executing in a processor and performing the method of claim 10.

* * * * *